United States Patent [19]

Case et al.

[11] Patent Number: 5,440,677
[45] Date of Patent: Aug. 8, 1995

[54] METHOD AND APPARATUS FOR PROCESSING AUDIO AND GRAPHIC IMAGES TO CREATE AN INTERLEAVED FILE SUITABLE FOR USE AS A CD-ROM PRODUCT

[75] Inventors: Michael B. Case, Sherman Oaks; Michael L. La Joie, Venice; Walter R. Klappert, Topanga; James A. Bumgardner, Sun Valley, all of Calif.

[73] Assignee: Time Warner Interactive Group Inc., Burbank, Calif.

[21] Appl. No.: 906,712

[22] Filed: Jul. 1, 1992

[51] Int. Cl.⁶ .............................................. G09B 19/04
[52] U.S. Cl. ...................................................... 395/154
[58] Field of Search ............... 395/154, 155, 152, 161, 395/600 MS File

[56] References Cited

U.S. PATENT DOCUMENTS

| | | | |
|---|---|---|---|
| 4,905,094 | 2/1990 | Pocock et al. | 395/154 X |
| 5,111,409 | 5/1992 | Gasper et al. | 395/154 X |
| 5,307,456 | 4/1994 | Mackay | 395/154 |

Primary Examiner—Mark K. Zimmerman
Assistant Examiner—Cliff Nguyen Vo
Attorney, Agent, or Firm—Blakely, Sokoloff, Taylor & Zafman

[57] ABSTRACT

A system and method for use as an authoring system for the development of CD-ROM products containing interleaved digitized audio and graphic images and other information which may be read and displayed or played under control of a computer. The graphic images and other computer information are stored in a file on the CD-ROM such that when the CD-ROM is accessed by a user, the graphic images and other computer information are displayed and made available to the user synchronously with the playing of the audio information. Combinations of several streams of audio and graphic/computer information can be interleaved into the same file. The system enables an editor to combine various audio files in synchronization with multiple graphic images into a single file which can then be stored on a CD-ROM. Other computer information can also be interleaved with the graphics and audio to allow for control over the playback at runtime. The graphics and other computer information are referred to herein collectively as "resources." The system allows the temporal and spatial placement of the resources on a run time computer screen to be displayed at a time and position which is specified by the editor when authoring.

21 Claims, 13 Drawing Sheets

| RTFile | Layout | Display | Translation | Image | Action | Audio | Range | Time | Misc |
|---|---|---|---|---|---|---|---|---|---|

Create new RTfile sequence
PLATFORM 640x480 DISPLAY SETTING: DURATION 00:15 DOWN WIPE   NO TRANSLATE
RTFILE PT  SPINE A
           LOAD         BEGIN                DURATION            ACTION :
           DISPLAY      BEGIN                DURATION
           LOCATION     BEGIN                 WIDTH       HEIGHT        CROP
TIME                                  CURRENT 00:00:00                  SELECT 15:38:14

| – | 0 | 0 | 0 | 0 | 0 | 0 | 0 | 0 | 1 | 1 | 1 | 1 | 1 | 1 | 1 | 2 | 2 | 2 | 2 | 2 | 2 | 2 | 3 |
|---|---|---|---|---|---|---|---|---|---|---|---|---|---|---|---|---|---|---|---|---|---|---|---|
| B | 0 | 1 | 2 | 3 | 4 | 6 | 7 | 8 | 9 | 0 | 2 | 3 | 4 | 5 | 6 | 8 | 9 | 0 | 1 | 2 | 4 | 5 | 6 | 7 | 8 | 0 |
| A | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 |
| C | 0 | 2 | 4 | 6 | 8 | 0 | 2 | 4 | 6 | 8 | 0 | 2 | 4 | 6 | 8 | 0 | 2 | 4 | 6 | 8 | 0 | 2 | 4 | 6 | 8 | 0 |
| K | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| + | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 4a

| RTFile | Layout | Display | Translation | Image | Action | Audio | Range | Time | Misc |

Create | New | sequence
PLAT | Delete | 80 DISPLAY SETTING: DURATION 00:15  DOWN WIPE   NO TRANSLATE
RTFIL | Add Audio | A
| Add Image |
| Del Audio | BEGIN          DURATION             ACTION :
| Del Image | AY BEGIN       DURATION
          TION BEGIN                WIDTH        HEIGHT       CROP
TIME                     CURRENT 00:00:00                 SELECT 06:04:04

| RTFile | Layout | Display | Translation | Image | Action | Audio | Range | Time | Misc |

PLATFORM 640x480 DISPLAY SETTING: DURATION 00:15  DOWN WIPE  NO TRANSLATE
RTFILE PT  SPINE A
           LOAD       BEGIN           DURATION         ACTION :
           DISPLAY    BEGIN           DURATION
           LOCATION   BEGIN           WIDTH    HEIGHT       CROP
TIME                        CURRENT 00:00:00              SELECT 05:19:22

| | | | | | | | | | | | | | | | | | | | | | | | |
|---|---|---|---|---|---|---|---|---|---|---|---|---|---|---|---|---|---|---|---|---|---|---|---|---|
| − | 0 0 | 0 1 | 0 2 | 0 3 | 0 4 | 0 6 | 0 7 | 0 8 | 0 9 | 1 0 | 1 2 | 1 3 | 1 4 | 1 5 | 1 6 | 1 8 | 1 9 | 2 0 | 2 1 | 2 2 | 2 4 | 2 5 | 2 6 | 2 7 | 2 8 | 3 0 |
| B A C K | 0 0 | 1 2 | 2 4 | 3 6 | 4 8 | 0 0 | 1 2 | 2 4 | 3 6 | 4 8 | 0 0 | 1 2 | 2 4 | 3 6 | 4 8 | 0 0 | 1 2 | 2 4 | 3 6 | 4 8 | 0 0 | 1 2 | 2 4 | 3 6 | 4 8 | 0 0 |
| + | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |

FIG. 4c

| RTFile | Layout | Display | Translation | Image | Action | Audio | Range | Time | Misc |

PLATFORM 640x480 DISPLAY SETTING: DURATION 00:15   DOWN WIPE   NO TRANSLATE
RTFILE PT   SPINE A
            LOAD      BEGIN           DURATION            ACTION :
            DISPLAY   BEGIN           DURATION
            LOCATION  BEGIN           WIDTH       HEIGHT      CROP
TIME                          CURRENT 00:00:00              SELECT 25:33:16

| | | | | | | | | | | | | | | | | | | | | | | | | |
|---|---|---|---|---|---|---|---|---|---|---|---|---|---|---|---|---|---|---|---|---|---|---|---|---|---|
| – | 0 | 0 | 0 | 0 | 0 | 0 | 0 | 0 | 0 | 1 | 1 | 1 | 1 | 1 | 1 | 1 | 1 | 2 | 2 | 2 | 2 | 2 | 2 | 2 | 3 |
|   | 0 | 1 | 2 | 3 | 4 | 6 | 7 | 8 | 9 | 0 | 2 | 3 | 4 | 5 | 6 | 8 | 9 | 0 | 1 | 2 | 4 | 5 | 6 | 7 | 8 | 0 |
| B | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 |
| A | 0 | 2 | 4 | 6 | 8 | 0 | 2 | 4 | 6 | 8 | 0 | 2 | 4 | 6 | 8 | 0 | 2 | 4 | 6 | 8 | 0 | 2 | 4 | 6 | 8 | 0 |
| C |   |   |   |   |   |   |   |   |   |   |   |   |   |   |   |   |   |   |   |   |   |   |   |   |   |   |
| K | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| + | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 4d

| RTFile | Layout | Display | Translation | Image | Action | Audio | Range | Time | Misc |

PLATFORM 640x480 DISPLAY SETTING: DURATION 00:15  DOWN WIPE  NO TRANSLATE
RTFILE PT  SPINE A
           LOAD      BEGIN            DURATION       ACTION :
           DISPLAY   BEGIN            DURATION
           LOCATION  BEGIN            WIDTH          HEIGHT      CROP
TIME                       CURRENT 00:00:00                      SELECT 02:54:20

| | | | | | | | | | | | | | | | | | | | | | | | | |
|---|---|---|---|---|---|---|---|---|---|---|---|---|---|---|---|---|---|---|---|---|---|---|---|---|---|
| - | 0 | 0 | 0 | 0 | 0 | 0 | 0 | 0 | 1 | 1 | 1 | 1 | 1 | 1 | 1 | 1 | 2 | 2 | 2 | 2 | 2 | 2 | 2 | 2 | 3 |
|   | 0 | 1 | 2 | 3 | 4 | 6 | 7 | 8 | 9 | 0 | 2 | 3 | 4 | 5 | 6 | 8 | 9 | 0 | 1 | 2 | 4 | 5 | 6 | 7 | 8 | 0 |
| B | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 |
| A | 0 | 2 | 4 | 6 | 8 | 0 | 2 | 4 | 6 | 8 | 0 | 2 | 4 | 6 | 8 | 0 | 2 | 4 | 6 | 8 | 0 | 2 | 4 | 6 | 8 | 0 |
| C | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| K+ | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 4e

| RTFile | Layout | Display | Translation | Image | Action | Audio | Range | Time | Misc |

PLATFORM 640x480  DISPLAY SETTING: DURATION 00:15  DOWN WIPE  NO TRANSLATE
RTFILE PT  SPINE A
           LOAD        BEGIN           DURATION          ACTION :
           DISPLAY     BEGIN           DURATION
           LOCATION    BEGIN           WIDTH       HEIGHT        CROP
TIME                           CURRENT 00:00:00               SELECT 04:11:19

| | | | | | | | | | | | | | | | | | | | | | | | | |
|---|---|---|---|---|---|---|---|---|---|---|---|---|---|---|---|---|---|---|---|---|---|---|---|---|---|
| – | 00 | 00 | 00 | 00 | 00 | 00 | 00 | 00 | 10 | 11 | 11 | 11 | 11 | 11 | 11 | 12 | 12 | 12 | 12 | 12 | 12 | 12 | 12 | 13 |
|   | 01 | 12 | 23 | 34 | 46 | 57 | 68 | 79 | 80 | 92 | 03 | 14 | 25 | 36 | 48 | 59 | 60 | 71 | 82 | 94 | 05 | 16 | 27 | 38 | 40 |
| B | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 |
| A | 0 | 2 | 4 | 6 | 8 | 0 | 2 | 4 | 6 | 8 | 0 | 2 | 4 | 6 | 8 | 0 | 2 | 4 | 6 | 8 | 0 | 2 | 4 | 6 | 8 | 0 |
| C |
| K | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| + | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 4f

| RTFile | Layout | Display | Translation | Image | Action | Audio | Range | Time | Misc |

PLATFORM 640x480  DISPLAY SETTING: DURATION 00:15  DOWN WIPE   NO TRANSLATE
RTFILE PT  SPINE A
           LOAD      BEGIN           DURATION           ACTION :
           DISPLAY   BEGIN           DURATION
           LOCATION  BEGIN                WIDTH         HEIGHT        CROP
TIME                           CURRENT 00:00:00                       SELECT 09:07:20

| TIME | | | | | | | | | | | | | | | | | | | | | | | | |
|---|---|---|---|---|---|---|---|---|---|---|---|---|---|---|---|---|---|---|---|---|---|---|---|---|
| − | 0 | 0 | 0 | 0 | 0 | 0 | 0 | 0 | 1 | 1 | 1 | 1 | 1 | 1 | 1 | 2 | 2 | 2 | 2 | 2 | 2 | 2 | 3 |
| B | 0 | 1 | 2 | 3 | 4 | 6 | 7 | 8 | 9 | 0 | 2 | 3 | 4 | 5 | 6 | 8 | 9 | 0 | 1 | 2 | 4 | 5 | 6 | 7 | 8 | 0 |
| A | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 |
| C | 0 | 2 | 4 | 6 | 8 | 0 | 2 | 4 | 6 | 8 | 0 | 2 | 4 | 6 | 8 | 0 | 2 | 4 | 6 | 8 | 0 | 2 | 4 | 6 | 8 | 0 |
| K | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| + | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 4g

| RTFile Layout Display Translation Image Action Audio Range Time Misc |
|---|

PLATFORM 640x480 DISPLAY SETTING: DURATION 00:15 DOWN WIPE NO TRANSLATE
RTFILE PT SPINE A
        LOAD     BEGIN        DURATION      ACTION :
        DISPLAY  BEGIN        DURATION
        LOCATION BEGIN        WIDTH     HEIGHT     CROP
TIME                          CURRENT 00:15:00                SELECT 04:21:07

|  | | | | | | | | | | | | | | | | | | | | | | |
|---|---|---|---|---|---|---|---|---|---|---|---|---|---|---|---|---|---|---|---|---|---|---|
| − | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|   | 0 | 0 | 0 | 0 | 1 | 1 | 1 | 2 | 2 | 2 | 2 | 3 | 3 | 3 | 4 | 4 | 4 | 4 | 5 | 5 | 5 | 6 | 6 | 6 | 6 | 7 |
| B A C K | 0 | 1 | 3 | 5 | 0 | 2 | 4 | 0 | 1 | 3 | 5 | 1 | 2 | 4 | 0 | 2 | 3 | 5 | 1 | 3 | 4 | 0 | 2 | 4 | 5 | 1 |
|  | 0 | 7 | 4 | 2 | 9 | 7 | 4 | 1 | 9 | 6 | 4 | 1 | 8 | 6 | 3 | 1 | 8 | 5 | 3 | 0 | 8 | 5 | 2 | 0 | 7 | 5 |
| + | 0 | 1 | 2 | 0 | 1 | 0 | 1 | 2 | 0 | 1 | 0 | 1 | 2 | 0 | 2 | 0 | 1 | 2 | 0 | 2 | 0 | 1 | 2 | 1 | 2 | 0 |
|   | 0 | 2 | 4 | 6 | 8 | 1 | 3 | 5 | 7 | 8 | 2 | 4 | 6 | 8 | 0 | 3 | 5 | 7 | 9 | 1 | 4 | 6 | 8 | 0 | 2 | 5 |

AUDIO START                     AUDIO END

| RTFile | Layout | Display | Translation | Image | Action | Audio | Range | Time | Misc |

PLATFORM 640x480 DISPLAY SETTING: DURATION 02:00  DISSOLVE  COMPRESS 5:4
RTFILE PT SPINE A
          LOAD       BEGIN         DURATION        ACTION :
          DISPLAY    BEGIN         DURATION
          LOCATION   BEGIN              WIDTH      HEIGHT       CROP
TIME                           CURRENT 00:00:00                 SELECT 00:58:20

| | | | | | | | | | | | | | | | | | | | | | | | |
|---|---|---|---|---|---|---|---|---|---|---|---|---|---|---|---|---|---|---|---|---|---|---|---|---|
| − | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| B A C K | 0 | 0 | 0 | 1 | 1 | 1 | 1 | 1 | 2 | 2 | 2 | 2 | 3 | 3 | 3 | 3 | 3 | 4 | 4 | 4 | 4 | 4 | 5 | 5 | 5 | 5 |
|  | 3 | 5 | 7 | 0 | 2 | 4 | 6 | 8 | 1 | 3 | 5 | 7 | 0 | 2 | 4 | 6 | 8 | 1 | 3 | 5 | 7 | 9 | 2 | 4 | 6 | 8 |
| + | 1 | 2 | 2 | 0 | 1 | 1 | 2 | 2 | 0 | 1 | 1 | 2 | 0 | 0 | 1 | 2 | 2 | 0 | 0 | 1 | 2 | 2 | 0 | 1 | 1 | 2 |
|  | 5 | 2 | 6 | 4 | 1 | 7 | 3 | 9 | 6 | 2 | 6 | 5 | 1 | 7 | 3 | 0 | 6 | 2 | 9 | 5 | 1 | 7 | 4 | 0 | 6 | 3 |

Image Load Time    Image Display Time

A000

1000    —Duration Of Display Effect

Image Load Duration

FIG. 4i

| RTFile | Layout | Display | Translation | Image | Action | Audio | Range | Time | Misc |

PLATFORM 640x480 DISPLAY SETTING: DURATION 02:00 DISSOLVE   COMPRESS 5:4
RTFILE PT   SPINE A  IMAGE   000
            LOAD     BEGIN 00:05:05   DURATION 14:04  ACTION : NONE
            DISPLAY  BEGIN 00:19:09   DURATION 02:00           COMPRESS 5:4
            LOCATION BEGIN ( 49,109)  WIDTH 454  HEIGHT 199    CROP ( 0, 0)
TIME                           CURRENT 00:19:09               SELECT 00:05:29

| | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|
| — | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| B | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| A | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| C | 4 | 4 | 4 | 4 | 4 | 4 | 5 | 5 | 5 | 5 | 5 | 5 | 6 | 6 | 6 | 6 | 6 | 6 | 7 | 7 | 7 | 7 | 7 | 8 |
| K | 0 | 0 | 1 | 1 | 2 | 2 | 0 | 0 | 1 | 1 | 1 | 2 | 2 | 0 | 0 | 1 | 1 | 2 | 2 | 0 | 0 | 1 | 1 | 2 | 2 | 0 |
| + | 3 | 7 | 2 | 7 | 1 | 6 | 1 | 5 | 0 | 5 | 9 | 4 | 9 | 3 | 8 | 3 | 7 | 2 | 7 | 1 | 6 | 1 | 5 | 0 | 5 | 0 |

Palette Load Time
↓
| P000 | 1000 |

FIG. 4j

METHOD AND APPARATUS FOR PROCESSING AUDIO AND GRAPHIC IMAGES TO CREATE AN INTERLEAVED FILE SUITABLE FOR USE AS A CD-ROM PRODUCT

SUMMARY OF THE INVENTION

The invention is a system and method which is for use as an authoring system for the development of CD-ROM products containing interleaved digitized audio and graphic images and other information which may be read and displayed or played under control of a computer. The invented system provides a great degree of flexibility in the types of audio and graphic images that can be processed and the types of run time platforms on which the information on the CD-ROM product can be played and displayed. By use of the invention, the graphic images and other computer information are stored in a file on the CD-ROM such that when the CD-ROM is accessed by a user, the graphic images and other computer information are displayed and made available to the user synchronously with the playing of the audio information. Combinations of several streams of audio and graphic/computer information can be interleaved into the same file allowing the user, at run time, to choose which stream is to be viewed and which stream is to be listened to at any given time. This technique of allocating portions of the available bandwidth to multiple data streams is known as banding. The data streams are referred to as spines.

In addition to providing an authoring system, the invention specifies an interleaved data format that meets two criteria. Firstly it works well with low bandwidth media and, in its current embodiment, is optimized for storage on CD-ROM. Secondly, the interleaved nature of the data structure permits buffered playback which delivers continuous audio synchronized with the display of graphic images. With prior art techniques the length of an audio/graphics playback is limited by the amount of RAM available in the playback machine because all audio data is read into RAM before audio playback can commence. For example, five minutes of 22 kBs (kBytes per second), 8 bit sound requires about 6.5 MBytes of RAM space to be played without interruption. In the scheme provided by the invention audio data is loaded and played as needed in an real time fashion.

The invention is a system which enables an editor to combine various audio files in synchronization with multiple graphic images into a single file which can then be stored on a CD-ROM. Other computer information can also be interleaved with the graphics and audio to allow for control over the playback at runtime. The graphics and other computer information are referred to herein collectively as "resources." The system allows the temporal and spatial placement of the resources on a run time computer screen to be displayed at a time and position which is specified by the editor when authoring. The resources so placed will be displayed at the specified time and in the designated screen location at run time. The system allows for a simulated playback at any time during the development of the CD-ROM product. This allows the editor to view the file before it has been interleaved for esthetic content and to identify timing and other conflicts. When the editor has determined that the authoring process is complete, the system allows for the building of a real time file. The real time file consists of packets of audio data interleaved with packets of graphics and other computer data. The interleaved real time file is then transferred to a CD-ROM which can be played back on various computer platforms. The current implementation of the real time file builder produces sequences to be played back at 44 kBs (kilobytes per second) from a CD-ROM in one embodiment. The techniques used can be applied to the maximum bandwidth of the playback platform, e.g. 150 kBs in MODE 1 CD-ROM, 171 kBs using MODE 2 CD-ROM-XA.

The invention, in its current embodiment, accommodates the following types of input data:
Two types of audio data as follows:
 ~22 kBs (22050 Hz) 8 bit sound (RAW unsigned pcm sound);
 CD-ROM-XA sound (compressed adpcm sound).
Graphics images as follows:
 Up to 640×480×256 color, such as files in PICT format (images smaller than this can be cropped and positioned as the authoring editor sees fit).
Other Data as follows:
 Palette information files (i.e. data identifying a particular 256 color palette to be used with various graphics images);
 Action Buttons (i.e. a small graphic displayed at runtime which is associated with a preprogrammed action which executes when the user selects the small graphic by, for example, operation of a mouse or other pointing device);
 Streaming Text Files (e.g. an ASCII file which would be displayed synchronously with an audio playback of a spoken script as in an English subtitle to a Spanish narrative).

BRIEF DESCRIPTION OF THE DRAWINGS

FIGS. 4a–4j are screen displays produced while using the invented system.

DETAILED DESCRIPTION OF THE INVENTION

Figure 1:
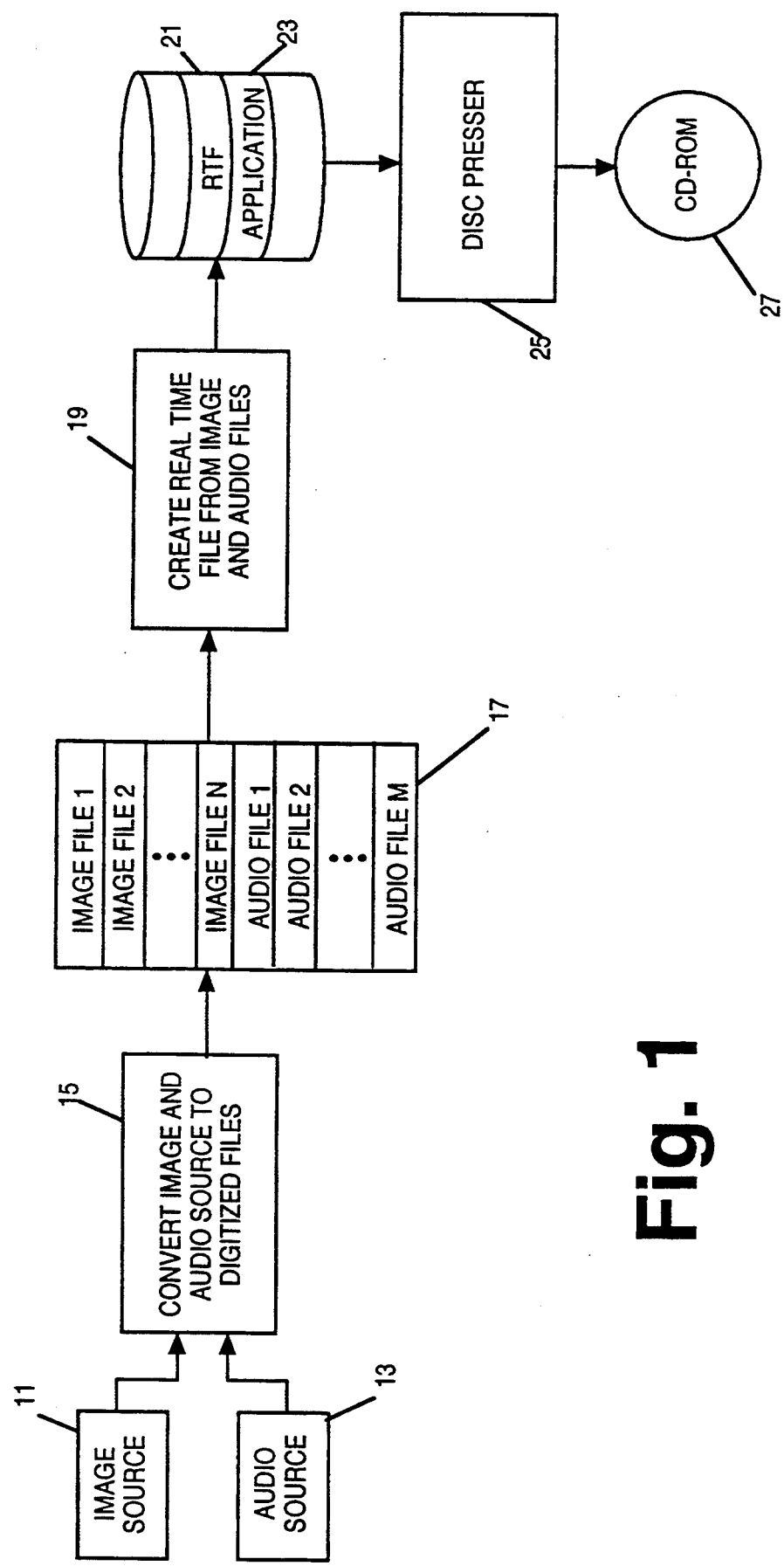
FIG. 1 is a block diagram showing the components and processing performed by the invented system.

Referring to FIG. 1, an image which is desired to be included as part of a CD-ROM product is created by an analog image source 11 such as a drawing, photograph, video frame or the like. Similarly, the desired audio is created by an audio source 13 such as a tape, compact disc, microphone or the like. In both cases, the analog source is digitized 15 and stored on a storage medium 17. The image digitization may be performed by a scanner and associated software available from a number of manufacturers capable of creating graphics files of up to 640×480 pixels with up to 256 colors, such as files in PICT format. The audio digitization may be performed by a sound digitizer and associated software available from a number of manufacturers capable of creating sound files of up to 22 kBs (22050 Hz) 8 bit sound (raw unsigned pcm sound) or CD-ROM-XA sound (compressed adpcm sound). The storage medium 17 may be any relatively large capacity hard disk (e.g. 600 MBytes).

Once the desired image files and sound files have been created and stored on storage medium 17, the invented real time file builder processing 19 may be performed to create a real time file 21. An application 23, where the application is a run time module which is downloaded when the end user first accesses the CD-ROM product, controls the reading/playback of the real time file. The created real time file and application are stored on a removable storage medium, such as an Exabyte Tape, and the entire storage medium is then taken to a disc presser 25 who actually manufactures the CD-ROM 27.

A CD-ROM has an available bandwidth of about 150 kBs as defined by the Yellow book standard. In multi-media applications, it is frequently desired to display graphic images while at the same time playing audio. It should be recognized that even with the invented system, full motion video of 30 full screen images per second is usually not possible. But a pleasing "slide show" presentation with continuous sound of reasonably good quality is readily obtainable. Further, a small area of the screen could be updated using a real time file created with the invention to simulate full motion video. An example of this would be to update an area of the screen 100 pixels by 100 pixels (10,000 bytes) at a rate of 7.5 images per second from a real time file interleaved with audio recorded at 11 kBs. The methods required to develop a real time file of this description using the techniques in this invention would be apparent to anyone skilled in the art.

Figure 2:
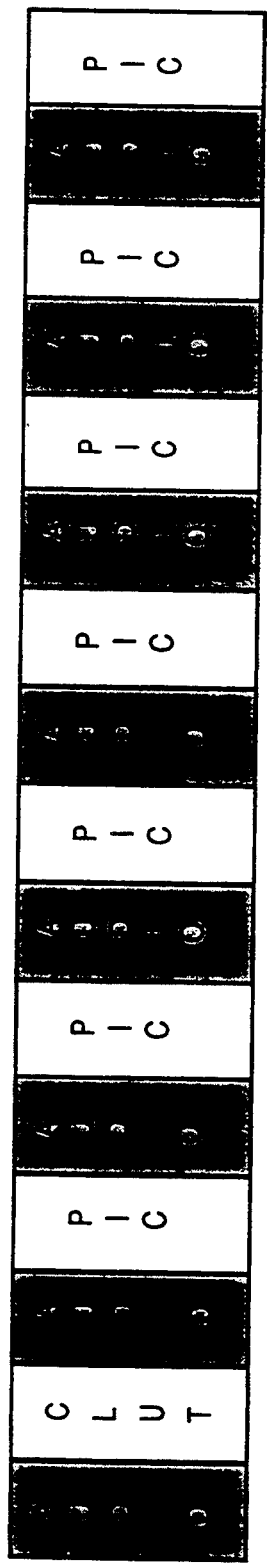
FIG. 2 is a representation of the layout of packets of data created by the system which are stored on a CD-ROM.

According to the Yellow book standard in MODE 1, CD-ROM data is stored in data sectors, with each sector being 2352 bytes, with 2048 bytes available for user data and the remainder being for header information and error detection and correction. The user data may be of any type (e.g. hexadecimal data for use by a database or other preprogrammed application, ASCII coded data, graphics data, sound data or whatever). At run time, the packets are read off the CD-ROM at about 75 packets per second such that 155 kilobytes of data are available per second or a total available bandwidth of about 150 kBs. The invention has been designed to develop real time files needing 44 kBs bandwidth for playback on 'worst case' machines providing an available bandwidth of as little as 66 kBs (the extra 22 kBs is desirable head room to compensate for the drive reseeking). To provide fair quality sound, 22,050 bytes of raw PCM data are needed per second (22 kBs), thereby leaving 22 kBs of bandwidth available for graphics and data. In most multi-media applications, an interruption of the audio information rather than images is more readily apparent and thus has the greater requirement for continuity. Thus, to ensure sound continuity, sound data is stored in every other packet, with image data and other information stored in the other packets as shown in FIG. 2. The difficulty lies in interleaving data from the various files in packets to obtain a desired synchronization with the sound being played at run time.

The invented system uses a computer program to assist an editor to select desired sound, image and data files and lay them out on a video display so that the various timing relationships can be seen, and once the editor is satisfied with the layout, the real time file with interleaved packets of sound, image and other data is created.

Below is a description of the functions of the program as they appear in a menu, and a brief description of each one. There are 9 menu items, with each having a plurality of sub-functions.

The menu items are:

RTFILE: enables the selection of sub-functions relating to the playing of audio displaying of graphics; initializing, loading and saving of sequence files and creating of a real time file from the currently loaded sequence.

LAYOUT: enables the selection of sub-functions relating to the creation and editing of layouts representing the available bandwidth and how audio and image spines are allocated.

DISPLAY: enables the selection of sub-functions relating to the manner in which images are displayed.

TRANSLATION: enables the selection of sub-functions relating to the expansion and compression of images.

IMAGE: enables the selection of sub-functions relating to the addition, copying and deletion of image resources within previously allocated image spines.

ACTION: enables the selection of sub-functions relating to the runtime selection of realtime files.

AUDIO: enables the selection of sub-functions relating to the loading and deletion of audio files within previously allocated audio spines.

RANGE: enables the selection of sub-functions relating to the loading, deleting and moving of sequence subsets.

TIME: enables the selection of sub-functions relating to setting the beginning and ending of times of sequences.

The following sets forth for each menu item a description of each of its sub-functions:

RTFILE
Play
    Playback loaded sequence of audio and time graphics from currently selected time (as determined by Set Time).
Make
    Make Real Time File. Interleaves data packets of audio and other computer data. Complies with a Real Time File format as defined in Tables II–VI below. This function could be used to develop other real time file formats, like CD-ROM-XA RT File, by persons skilled in the art.
List
    Convert sequence into ASCII list of times and resources and saves as ASCII file.
Save
    Save currently loaded sequence file.
New
    Clear sequence and create new sequence file.
Load
    Load existing sequence stored in ASCII from disk.
Exit
    Exit real time file builder.

LAYOUT
New
    Create a new layout. This layout is a representation of the entire available bandwidth, e.g. 44 kBs, to be divided into spines through banding.
Delete
    Delete existing layout.
Add Audio
    Add an audio spine. Apply banding technique to allocate 22 kBs to audio spine. Banding lends itself to spines of larger or smaller bandwidths limited only by the platform designated for playback.

Add Image
    Add an image spine. Image spines can be allocated as little as 5.5 kBs of bandwidth. The actual amount allocated to the image spine being added depends upon overall amount available. Existing image spines are reduced in bandwidth to accommodate multiple spines. Resources already placed in the sequence are automatically adjusted to reflect changes in load and display times due to decreased available bandwidth. These banding techniques can be used regardless of bandwidth available.
Del Audio
    Delete selected audio spine.
Del Image
    Delete selected image spine.
DISPLAY
Down Wipe
    Set default display method to downwipe. Images added with this default will be displayed top down.
Up Wipe
    Images added with this default set will be displayed from the bottom up.
Left Wipe
    Images added with this default set will be displayed from the left to right.
Right Wipe
    Images added with this default set will be displayed from the right to left.
Dissolve
    Images added with this default set will be displayed using a dissolve.
Fade
    Images added with this default set will be displayed using a fade up.
TRANSLATION
None
    Display the image exactly as it was stored.
Expand 1:2
    Expand the image 1 to 2. Used to display images created in 320×240 mode on a 640×480 screen.
Compress 2:1
    Compress the image 2:1
Compress 5:4
    Compress the image 5 to 4. Useful for cross platform display of the same image file.
Compress 6:5
    Compress the image 6 to 5. Useful for cross platform display of the same image file.
IMAGE
New
    Add a new resource. The operator selects the location and size on a separate RGB monitor of the new resource to be added to the sequence at the currently selected time. The amount of time required to load and display the resource is automatically calculated based upon its size, type and display effect. Banding considerations are also taken into account.
Copy
    Copy the selected resource to another time in the sequence or across spines.
Copy Size
    Duplicate the size of the selected resource.
Copy to Time
    Copy selected resource to specified time.
Delete
    Delete selected resource from the sequence.
Load From
    Load image file (PICT format) into selected resource. The editor is prompted for the name or the image file to load. The PICT file is converted to a format as set forth in Table I created for the use with the invented system. Palette information is removed and compared to the palette currently being applied to images in this spine. If the palettes are the same the new palette is ignored. If not a palette is automatically created and placed in the sequence immediately prior to the selected resource.

TABLE I

| | |
|---|---|
| int xsize | */ the width in pixels of the image */ |
| int ysize | */ the height in pixels of the image */ |
| int pictype | */ 0 for raw format */ |
| char image_data[xsize * ysize] | */ an array of index values corresponding to the current palette */ |

Load
    Load a PICT file named to coincide with the current image resource. The editor is prompted if the correct image file does not exist. The conversion process from PICT to the format of Table I is the same as set forth in Load From above.
Transparent
    Make background of image transparent for overlaying subject of image on current background.
Description
    Enter a description of the selected resource.
Change Time
    Enter a new display time for the selected resource. Banding considerations are taken into account when calculating new load and display times.
Set Display
    Set display attributes for the selected image. Display attributes are the Display Effect, Display Translation and Action. These attributes are set using other functions on the menu bar and then applied to the current image by selecting this function. The possible settings for each attribute are explained above and listed again below for clarity.
    DISPLAY EFFECT:
        Down Wipe
        Up Wipe
        Left Wipe
        Right Wipe
        Dissolve
        Fade
    DISPLAY TRANSLATION:
        None
        Expand 1:2
        Compress 2:1
        Compress 5:4
        Compress 6:5
    ACTION:
        None
        New Refill
        New Spine
        End Button
Move
    Allows rectangle representing the screen of a separate RGB monitor to be moved around by the pointing device. The RGB monitor is used to display images for the editor as they will appear at run time.
ACTION None
   Select no action for resource as default. Changes currently selected resource.
New RTFile
   Allows selected resource to call a specified real time file if end user chooses this resource at runtime.
New Spines
   Allows selected resource to change display or audio spines if end user chooses this resource at run time.
End Button
   Designate selected resource as an end or exit button.
AUDIO
Load
   Load audio file from disk into selected audio spine.
Delete
   Delete audio file from selected spine.
RANGE
Load
   Load a subset of the sequence.
Delete
   Delete a subset of the sequence
Delete Palette
   Delete the palette file from the specified range.
Move
   Make a copy of a subset of the sequence and move the copy to a different time and/or spine in the sequence.
TIME
Set
   Set current time in sequence. Selects the most recently displayed resource as the current resource. Can be used to set beginning of simulated playback.
Set End
   Set the end time of the sequence. The default end time is 30 minutes. Setting an end time less than the default has the effect of magnifying the resources displayed in the sequence.

Appendix I contain an object code listing of the above-described modules.

Figure 3:
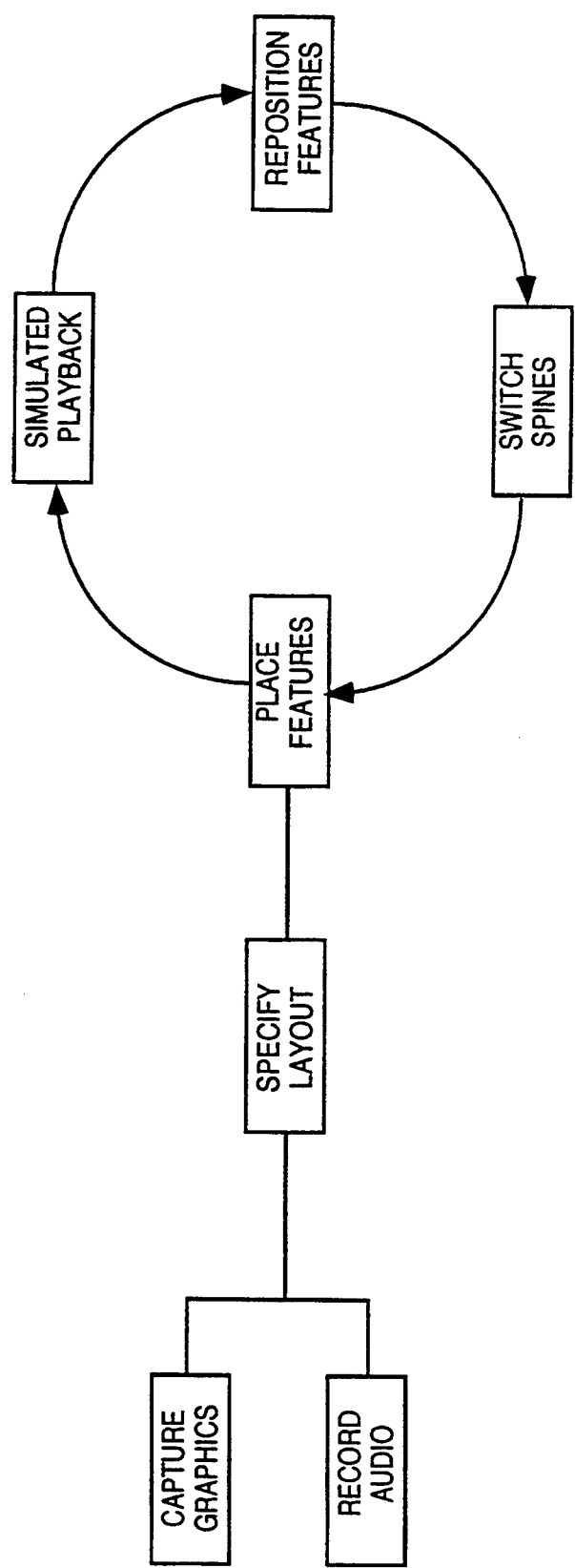
FIG. 3 is flow diagram showing the steps involved in building a real time file according to the present invention.

To use the invented real time file builder, the usual sequence of events is shown in FIG. 3. First, desired graphic images are captured and desired audio is recorded, both are digitized and stored as described above with reference to FIG. 1. Once the image and audio files 17 are created, the editor specifies the layout.

In a typical session, assuming the image and audio files 17 are already in place, and the system is ready for use by the editor, the screen display is as shown in FIG. 4a. The top of the display is the Menu items. The next portion of the display, known as the 'Status Bar', provides information about the systems current settings, current display effects and current image attributes. Below is a listing of the information fields in this section of the display:

PLATFORM: The screen resolution of the platform intended for playback of the Real Time File being created.

DISPLAY SETTINGS:
   DURATION: The amount of time represented in seconds and frames needed to display a full screen image given the current DISPLAY EFFECT and TRANSLATION settings. FIG. 4a shows a duration of 2 seconds to display a full screen image using a DISSOLVE effect and NO TRANSLATION.

RTFILE: Lists the currently loaded sequence. FIG. 4a show the 'OS' as loaded for editing.

SPINE: Lists the currently selected graphic spine. FIG. 4a show a single spine sequence with spine A selected.

The next three lines of the Status Bar contain information about the currently selected image
LOAD:
   BEGIN: The time in minutes, seconds and frames in the sequence to beginning loading the current image from disk.
   DURATION: The amount time required to retrieve the image from disk.
   ACTION: The action attached to the currently selected image.
DISPLAY:
   BEGIN: The time to in the sequence to begin display of the selected image.
   DURATION: The amount of time required to display the selected image given its size and the display settings
LOCATION:
   BEGIN: x,y coordinates of image origin
   WIDTH: width in pixels of image
   HEIGHT: height in pixels of image
   CROP: x,y crop origin of image
TIME:
   CURRENT: The current time set with set time.
   SELECT TIME: The time corresponding to the position of the editors stylus or other pointing device The middle portion of the display, known as the 'Time Bar' is a representation of the time line and placement within the timeline for the current sequence. Time is displayed vertically in three groups of two numbers each representing minutes, seconds and frames. The minutes are listed on top followed by a colon then the seconds another colon and finally the frames. FIG. 4a shows a time line beginning at 00:00:00 and ending at 00:54:04 (54 seconds 4 frames). The view of the time can changed by selecting a start and end time with the pointing device. The time line will then begin and end with those times and the graphics representing the images in the bottom portion of the display will be expanded to reflect the smaller slice of time being viewed. The editor can move forward and back in the view of the sequence time line by selecting + or − on the left side of the display. The view can be zoomed as outlined above and then returned to its previous by selecting 'BACK' on the left side of the display.

The bottom portion of the display is for the layout of the 44 kBs band to be created.

The first thing the editor does is to select the New sub-function from the LAYOUT menu resulting in a display containing a representation of an empty 44 kBs band as shown in FIG. 4b. Then the Add Audio sub-function is selected and a 22 kBs audio spine is allocated as shown in FIG. 4c. Then the Add Image sub-function is selected and a 22 kBs image spine is allocated as shown in FIG. 4d. If the Add Image sub-function is selected again, the 22 kBs image spine is split into two 11 kBs image spines as shown in FIG. 4e. A third selection of the Add Image sub-function divides the bottom 11 kBs image spine into two 5.5 kBs image spines as shown in FIG. 4f. A fourth selection of the Add Image sub-function divides the top 11 kBs image spine into two 5.5 kBs image spines so that there are four 5.5 kBs image spines as shown in FIG. 4g.

Once the spines are allocated as desired, the Load sub-function is selected from the AUDIO menu, assuming that the audio is to start immediately at runtime. If there is to be a delay before the start of audio, the Set sub-function is selected from the TIME menu and the editor is prompted to enter the desired start time relative to the beginning. The Load sub-function prompts the editor to load a desired audio file 17, and after the desired audio file is selected, it is loaded into the audio spine from the beginning or from the time entered by the Set sub-function. The start and end points of the loaded audio file are identified within the audio spine as shown in FIG. 4h. Any additional desired audio files may then be loaded in the remaining space within the allocated audio spine, at a later time.

Once the audio file or files are loaded, the New sub-function is selected from the IMAGE menu. This enables the editor to add resources and draw rectangles on a separate RGB monitor which is for display of the images as they will appear at run time, with each rectangle representing the size of a single image, as contrasted with the schematic representation of the resources on the main terminal showing the amount of time required to load and display the images given the bandwidth allocated to the selected image spine. Of course, there is a correlation between the two displays in that the larger the rectangle associated with any one resource, the greater the amount of time required to load and display the image for that resource. The loadtime and load duration along with the time required to display the resource are illustrated in FIG. 4i. The actual graphics are loaded into each rectangle on the separate RGB monitor by selecting the Load From sub-function from the IMAGE menu. The palette for the image is loaded as necessary. If a palette exists in the sequence prior to the load time of the image being added, the current image palette is compared to the current palette. If the palettes are identical then the current images palette is stripped and discarded. If the palettes are dissimilar or there is no palette currently loaded then a Palette file is automatically created and inserted into the sequence immediately prior to the load time of the image being added. FIG. 4j shows how the pallete load time is presented to the editor.

A graphic may also be loaded by the Load sub-function from the IMAGE menu which automatically loads an image named to correspond with the selected resource. This allows the editor to create a template consisting of a given number of resources and name the images in advance of creating the sequence. For example the first image resource on the first graphic spine on a directory named 'AA' would be referred to as resource 'AAIA000'. The first two characters 'AA' denote the directory where the sequence can be found; the third character 'I' identifies the type of resource, an image resource in this case ('A' is used for an audio resource and 'P' for a palette); the forth character 'A' identifies the spine of which the resource is a member ('B' is used for the second spine, 'C' for the third, etc.); the last three characters '000' represent the index of resources of this type for this spine in this sequence on this directory.

By default, images are drawn with a down wipe effect and no translation. Images can be displayed using different display effects and/or translations by changing the defaults using the sub-functions from the DISPLAY and TRANSLATION menus.

After the image resources and audio resources have been loaded, the resulting sequence is played by selecting the Play sub-function from the RTFILE menu. The editor views and listens to the results and then repositions the resources as necessary using the Change Time sub-function from the IMAGE menu. The remaining sub-functions allow for the creation of different effects or moving of images, the specifics of which should be apparent from the foregoing description of the sub-functions.

The system produces an output file containing images, audio and data all interleaved in a sequence defined by the editor which is suitable for converting to packets of data to be stored on a CD-ROM according to the Yellow book standard. A C language definition of the structure of this file is shown in Tables II–VI, where Table II shows the layout of audio blocks, Table III shows the layout of the first image block, Table IV shows the layout of subsequent image blocks, Table V shows the layout of a palette data block, Table VI shows the data structure of a union of image data from the first image block, subsequent image blocks and the palette data block.

TABLE II

```
/* layout of audio data blocks */
    struct {
        unsigned char spine,    /* Which spine of those available */
                      type,     /* 1 for audio */
                      subtype,  /* Used at runtime */
                      id;       /* this objects id in sequence */
        long length;            /* zero after first block */
        unsigned char data[2040]; /* This is the audio info. */
    } audiopack;
```

TABLE III

```
/* layout of first image data block */
typedef struct {
    unsigned char spine,    /* Which spine of those available */
                  type,     /* 2 for image data */
                  subtype,  /* used at runtime */
                  id;       /* this objects id in sequence */
    long length;            /* number of bytes in image */
    long disptime;          /* SMPTE time to display image */
    unsigned char xlattype, /* type of translation(list below) */
                  disptype; /* display effect (list below) */
    unsigned xsize,         /* un-cropped width of image */
             ysize;         /* un-cropped height of image */
    unsigned pictype;       /* 0 or 1 (defined below) */
    /* position and size of crop rectangle on source image */
    unsigned sourcexbeg,
             sourceybeg,
             sourcexsize,
             sourceysize;
    /* position and size of image on screen */
    unsigned destxbeg,
             destybeg,
             destxsize,
             destysize;
    unsigned char unused[32]; /* unused bytes */
    unsigned char data[1980]; /* This is the picture info */
} IMAGE_DATA_TYPE1;
```

TABLE IV

```
/*    layout of subsequent image data blocks    */
typedef struct {
    unsigned char spine,    /* Same as above */
                  type,     /* Same as above */
                  subtype,  /* Same as above */
                  id;       /* Same as above */
    long length;            /* always zero after first block */
    unsigned char data[2040]; /* This is the picture info */
} IMAGE_DATA_TYPE2;
```

TABLE V

```
/*    layout of palette data block    */
```

TABLE V-continued

```
typedef struct {
        unsigned char spine,  /* Same as above */
                       type,  /* 3 for palette type */
                    subtype,  /* Same as above */
                         id;  /* Same as above */
                 long length; /* always 0 */
           long paldata[256]; /* Palette data in RGB quad */
     unsigned char unused[1016]; /* Unused bytes */
        }
    IMAGE_DATA_TYPE3;
```

TABLE VI

```
              /*    Union for image data types     */
    union {
        IMAGE_DATA_TYPE1 image1;
        IMAGE_DATA_TYPE2 image2;
        IMAGE_DATA_TYPE3 palette;
    } imagepack;
    #define EMPTY_OBJECT       0    /* Object types (type) */
    #define AUDIO_OBJECT       1
    #define IMAGE_OBJECT       2
    #define PAL_OBJECT         3
    #define NO_XLAT         0x00    /* Image translation */
    #define EXP_1_2         0x08    /* types(xlattype) */
    #define DISP_DOWN_WIPE     0    /* Image display types
    #define DISP_DISSOLVE      8    (disptype) */
    #define DISP_FADE          9
    #define PIC_RAW            0    /* Image data compression
                                    types */
                                    #define PIC_32_RLE
                                        1    /*
    (pictype)                       /*
```

The system will readily accommodate other formats, e.g., CD-ROM-XA real time files by making appropriate changes to the invented system, which changes should be apparent to persons skilled in the art.

In addition to the created real time file 21, as shown in FIG. 1, an application 23 is also created on placed onto the CD-ROM. The application is downloaded into the user's computer at runtime when the user "plays" the CD-ROM.

We claim:

1. A system for use as an authoring system for the development of CD-ROM products containing interleaved digitized audio and graphic images and other information for reading, and displaying or playing under control of a computer comprising:
   a) means for converting a plurality of analog image and audio data to digitized image data and digitized audio data respectively;
   b) means for creating and storing as separate files said digitized image and digitized audio data, said separate files corresponding to said plurality of analog image and audio data;
   c) means for creating a single file for storage as CD-ROM data containing information from said separate files of digitized image and digitized audio data such that upon playback of said single file, said digitized audio data as played back is synchronized in a predetermined manner with said digitized image data as played back;
   d) means for converting said created single file into packets of information to be stored on a CD-ROM.

2. The system defined by claim 1 wherein said means for creating a single file comprises:
   a) means for displaying a representation of an empty band of information which is to contain representations of digitized audio and digitized image data;
   b) means for allocating space within said empty band for containing a representation of a spine of said digitized audio data and at least one spine of said digitized image data;
   c) means for loading a file of said digitized audio data for placing into said single file, determining the amount of time needed to play said loaded file of digitized audio data and indicating in said allocated spine of digitized audio data a representation of said determined play time;
   d) means for determining the amount of time needed to display an image of a predetermined size and indicating in said allocated at least one spine of digitized image data a representation of said determined display time;
   e) means for loading at least one file of said digitized image data for placing into said single file;
   f) means for generating said single file from said loaded file of digitized audio data and said at least one file of loaded digitized image data wherein said digitized audio data and said digitized image data are interleaved in a predetermined manner.

3. The system defined by claim 2 further comprising means for playing back said generated single file.

4. The system defined by claim 2 further comprising means for positioning and repositioning a location at which said digitized image data is to be displayed and for sizing and resizing the area to be used by said digitized image data.

5. The system defined by claim 2 further comprising means for adding a display effect to the digitized image data to be displayed during playback.

6. The system defined by claim 5 wherein said display effect is one of down wipe, up wipe, left wipe, right wipe, dissolve and fade.

7. The system defined by claim 2 further comprising means for providing a size translation to the digitized image data to be displayed during playback.

8. The system defined by claim 7 wherein the size translation is one of 1:2 expansion, 2:1 compression, 5:4 compression and 6:5 compression.

9. A method for use as an authoring system for the development of CD-ROM products containing interleaved digitized audio and graphic images and other information for reading and displaying or playing under control of a computer comprising the steps of:
   a) converting a plurality of analog image and audio data to digitized image data and digitized audio data respectively;
   b) creating and storing as separate files said digitized image data and said digitized audio data, said separate files corresponding to said plurality of analog image and audio data;
   c) creating a single file for storage as CD-ROM data containing information from said separate files of digitized analog image and digitized audio data such that upon playback of said single file, said digitized audio data as played back is synchronized in a predetermined manner with said digitized image data as played back;
   d) converting said generated single file into packets of information to be stored on a CD-ROM.

10. The method defined by claim 9 wherein said method step for creating a single file comprises the steps of:
   a) displaying a representation of an empty band of information which is to contain representations of digitized audio and digitized image data;

b) allocating space within said empty band for containing a representation of a spine of said digitized audio data and at least one spine of said digitized image data;

c) loading a file of said digitized audio data for placing into said single file, determining the amount of time needed to play said loaded file of digitized audio data and indicating in said allocated spine of digitized audio data a representation of said determined play time;

d) determining the amount of time needed to display an image of a predetermined size and indicating in said allocated at least one spine of digitized image data a representation of said determined display time;

e) loading at least one file of said digitized image data for placing into said single file;

f) generating said single file from said loaded file of digitized audio data and said at least one file of loaded digitized image data wherein said digitized audio data and said digitized image data are interleaved in a predetermined manner.

11. The method defined by claim 10 further comprising the step of playing back said generated single file.

12. The method defined by claim 10 further comprising the step of positioning and repositioning a location at which said digitized image data is to be displayed and for sizing and resizing the area to be used by said digitized image data.

13. The method defined by claim 10 further comprising the step of adding a display effect to the digitized image data to be displayed during playback.

14. The method defined by claim 13 wherein said display effect is one of down wipe, up wipe, left wipe, right wipe, dissolve and fade.

15. The method defined by claim 10 further comprising the step of providing a size translation to the digitized image data to be displayed during playback.

16. The method defined by claim 15 wherein the size translation is one of 1:2 expansion, 2:1 compression, 5:4 compression and 6:5 compression.

17. The method defined by claim 9 further comprising the step of positioning and repositioning a location at which said digitized image data is to be displayed and for sizing and resizing the area to be used by said digitized image data.

18. The method defined by claim 9 further comprising the step of adding a display effect to the digitized image data to be displayed during playback.

19. The method defined by claim 18 wherein said display effect is one of down wipe, up wipe, left wipe, right wipe, dissolve and fade.

20. The method defined by claim 9 further comprising the step of providing a size translation to the digitized image data to be displayed during playback.

21. The method defined by claim 20 wherein the size translation is one of 1:2 expansion, 2:1 compression, 5:4 compression and 6:5 compression.

* * * * *